(12) United States Patent
Krueger

(10) Patent No.: US 10,820,756 B2
(45) Date of Patent: Nov. 3, 2020

(54) CONTAINER AND LID ORGANIZER

(71) Applicant: Jeffrey Allan Krueger, Detroit Lakes, MN (US)

(72) Inventor: Jeffrey Allan Krueger, Detroit Lakes, MN (US)

( * ) Notice: Subject to any disclaimer, the term of this patent is extended or adjusted under 35 U.S.C. 154(b) by 0 days.

(21) Appl. No.: 16/842,911

(22) Filed: Apr. 8, 2020

(65) Prior Publication Data
US 2020/0229652 A1 Jul. 23, 2020

Related U.S. Application Data

(63) Continuation of application No. 16/525,753, filed on Jul. 3, 2019, now Pat. No. 10,653,276.

(60) Provisional application No. 62/748,007, filed on Oct. 19, 2018.

(51) Int. Cl.
*A47J 36/12* (2006.01)
*A47J 47/16* (2006.01)
*B65D 55/16* (2006.01)
*A47J 47/00* (2006.01)

(52) U.S. Cl.
CPC .............. *A47J 47/16* (2013.01); *B65D 55/16* (2013.01); *A47J 47/00* (2013.01)

(58) Field of Classification Search
CPC ...... B65D 21/0233; B65D 55/16; A47J 47/16; A47J 36/06; A47J 36/12
USPC .......................................................... 220/744
See application file for complete search history.

(56) References Cited

U.S. PATENT DOCUMENTS 4,390,002 A * 6/1983 Daily, III ............ A47J 37/0786
126/25 R

* cited by examiner

*Primary Examiner* — Stephen J Castellano
(74) *Attorney, Agent, or Firm* — Dunlap Bennett & Ludwig, PLLC

(57) ABSTRACT

A container and lid storage device is provided. The container and lid storage device includes a telescopic spine connected to a planar base, wherein the telescopic spine provides a plurality of support arms movable between a collapsed condition and an extended condition. A support hand is provided along a distal end of each support arm, each support hand dimensioned and adapted for supporting a plurality of containers, wherein each support hand is adapted to support a predetermined size different than that of an adjacent support hand. As a result, in the collapsed condition the support hand nests in downwardly adjacent containers.

6 Claims, 9 Drawing Sheets

US 10,820,756 B2

CONTAINER AND LID ORGANIZER

CROSS-REFERENCE TO RELATED APPLICATION

This application claims the benefit of priority of U.S. provisional application No. 62/748,007, filed 19 Oct. 2018, and application claims the benefit of priority, as a continuation, of U.S. non-provisional application Ser. No. 16/525,753, filed 30 Jul. 2019, now U.S. Pat. No. 10,653,276, the contents of which are herein incorporated by reference.

BACKGROUND OF THE INVENTION

The present invention relates to container storage and, more particularly, to a container and lid organizing and stacking device.

Containers with snap on lids for storing leftover food products are very common, and in fact most users have a plurality of such containers and lids of different sizes for storing different amounts of leftovers. Also common is that this collection of differently sized lids and containers is kept in a disorganized manner, demanding that the user hunt through and among their drawers, cabinets, basket, shelves, closets, pantries or other stored locations to find a complementary lid and container in a desired size.

As can be seen, there is a need for a container and lid organizing device embodying a system for stacking a plurality of containers and complementary lids of different sizes, shapes (e.g., round, oval, rectangular, square, hex, or the like), and materials (e.g., plastic, glass stainless steel, wood, or the like). The device of the present invention allows for all of these differently-sized containers and lids to be stored in one complete self-contained-kit in a stacked, nested orientation, thereby saving space. The present invention is adapted to be operable in any location, including most double high kitchen drawers, in standard adjustable shelved cabinets, on counter tops, or vertically mounted.

The present invention includes a plurality of telescopic arms, which are adapted to be selectively adjusted upward to reveal each container size for easy access and selectively adjusted downward in a collapsed storage condition, allowing containers of different sizes to be separately retained yet nested in each, adjacent larger size for concise storage in the self-contained unit.

The present invention may include specialized designed containers with associated lids adapted to attach not only to the top for airtight sealing but also to the side of the container. The systemic containers are dimensioned and adapted to nest down into the next larger size. The containers and lids may be colored coded by size and/or material for convenient identification and matching purposes. Thereby, the present invention improves the state of the art through nesting differently sized containers and lids into one concise unit by way of telescoping arms and operatively associated nesting baskets.

SUMMARY OF THE INVENTION

In one aspect of the present invention, a device for organizing lidded containers includes the following: a base; a telescopic spine extending upwardly from said base; the telescopic spine comprising a plurality of nestable spine portions so that the telescopic spine is movable between a collapsed condition and an extended condition; a support arm extending from each spine portion in a first direction over said base; a support hand provided by each distal end of each support arm, wherein each support hand is dimensioned to nest in an adjacent lower support hand in the nested condition, wherein each support arm extends generally perpendicularly from the spine portion over the base and then continues to extend downwardly as it extends further away from the spine portion before extending in an orientation generally co-planar with the base.

In another aspect of the present invention, a system of organizing containers and associated lids includes the following: providing a device for organizing lidded containers including the above-mentioned device; providing at least one container of a plurality of predetermined sizes, wherein each predetermined size is dimensioned to be associated and supported by one of the plurality of support hands; and placing each container on the associated support hand so that in the collapsed condition each support hand upwardly adjacent of one of the at least one container of the plurality of predetermined sizes nests therein; providing a lid for each associated container, wherein each lid is attachable to said associated container; and further providing a color code distinguishing each predetermined size.

These and other features, aspects and advantages of the present invention will become better understood with reference to the following drawings, description and claims.

DETAILED DESCRIPTION OF THE INVENTION

Figure 1:
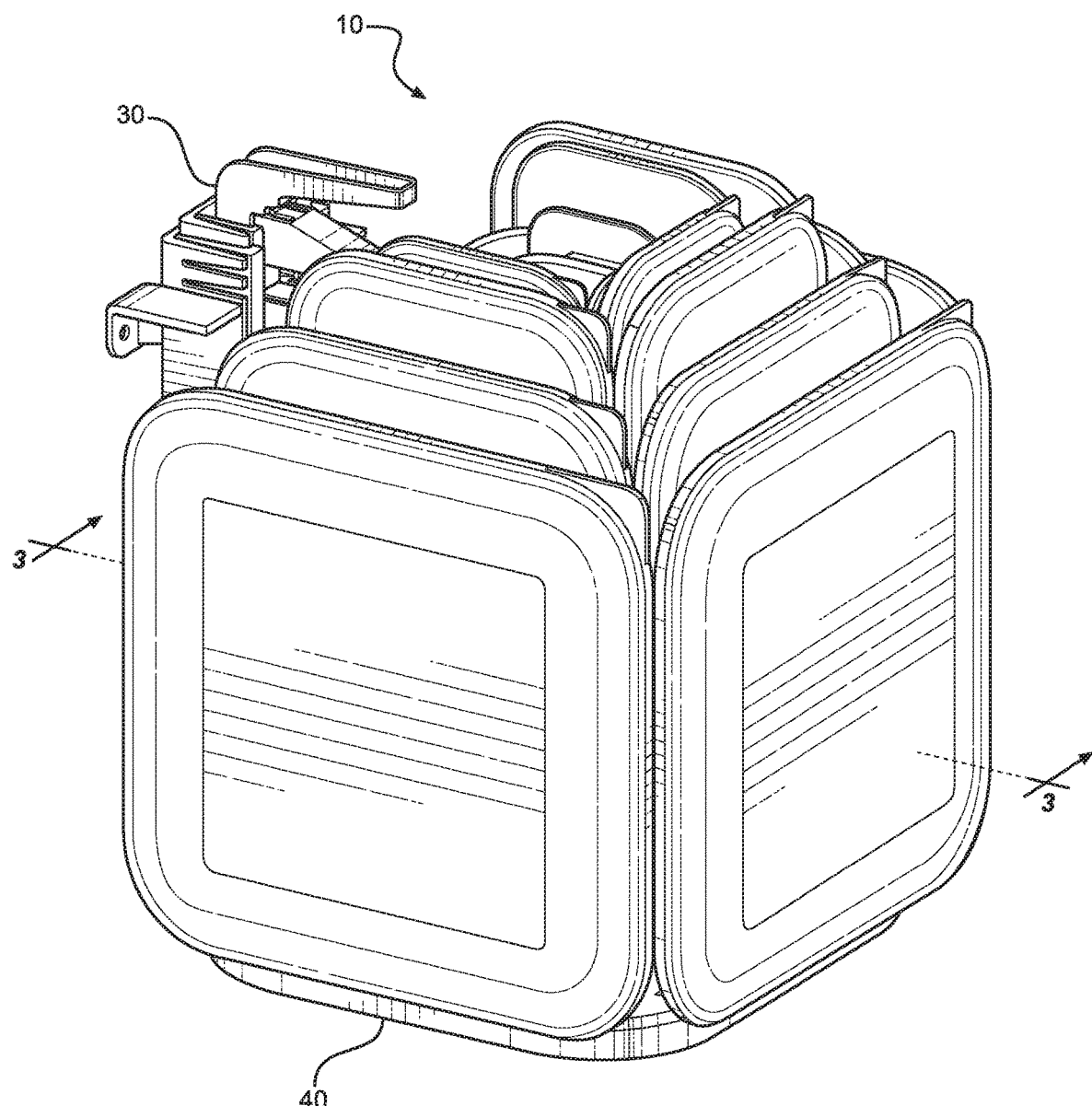
FIG. 1 is a perspective view of an exemplary embodiment of the present invention, shown in use in a collapsed condition.
Figure 2:
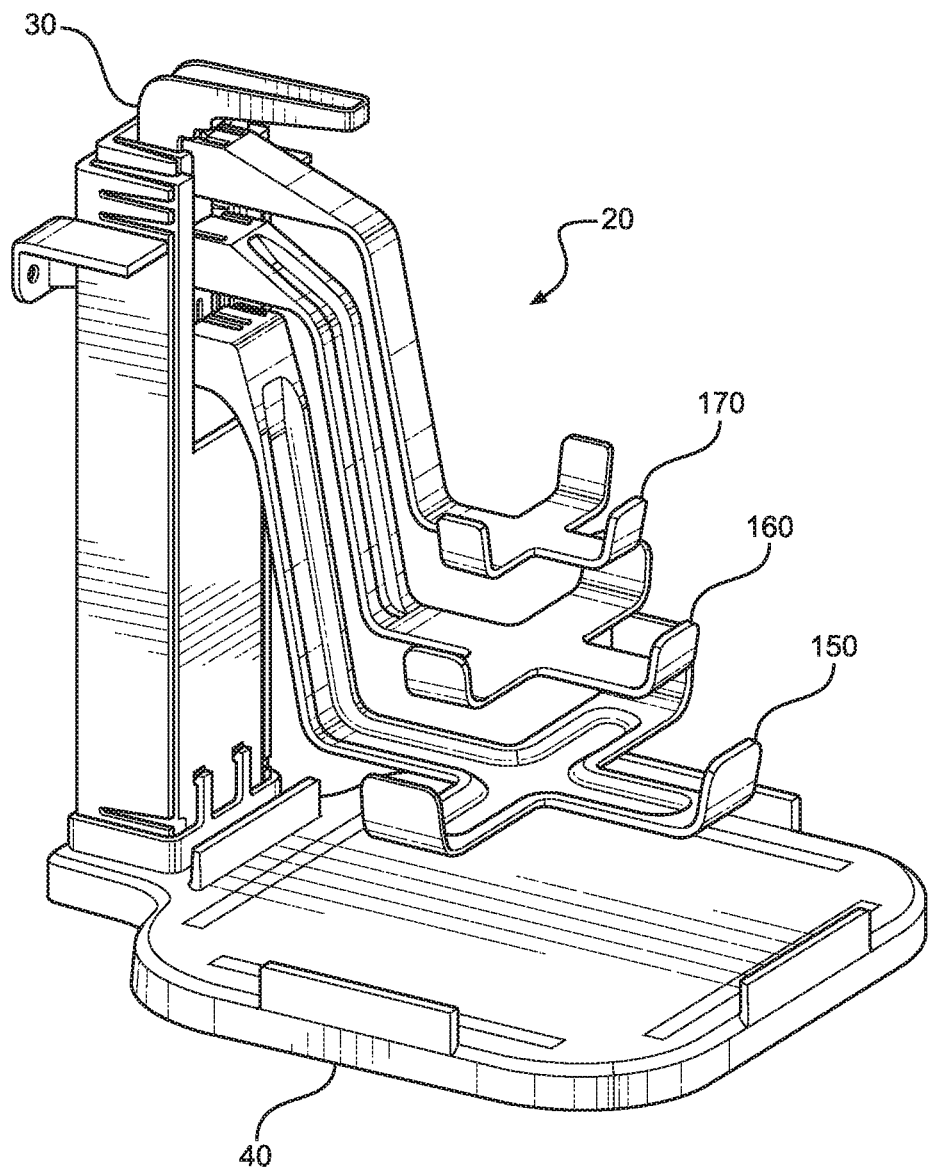
FIG. 2 is a perspective view of an exemplary embodiment of the present invention, demonstrating a base and spine assembly in the collapsed condition.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a container and lid storage device providing a telescopic spine connected to a planar base, wherein the telescopic spine provides a plurality of support arms movable between a collapsed condition and an extended condition. A support hand is provided along a distal end of each support arm, each support hand dimensioned and adapted for supporting a plurality of containers, wherein each support hand is adapted to support a predetermined size different than that of an adjacent support hand. As a result, in the collapsed condition the support hand nests in downwardly adjacent containers.

Referring to FIGS. 1 through 12, the present invention may include a container and lid storage device 10. The storage device 10 may include an elongated spine 30 perpendicularly attached to a planar base 40 defining a base and spine assembly 20. The spine 30 may include a plurality of telescopic portions 32 adapted to nest as the spine 30 collapses toward the base 40 so that the base and spine assembly 20 is movable between a collapsed condition (see FIG. 2) and an extended condition (see FIG. 5).

Each telescopic portion 32 may provide a support arm 35, 36, 37. It being understood that even though only three support arms are shown in the illustrations, there be more or less than three support arms as long as the present invention functions as disclosed herein. It should also be understood by those skilled in the art that the use of directional terms such as upper, lower, upward, downwardly, top and the like are used in relation to the illustrative embodiments as they are depicted in the figures: an upward direction (or upper) being toward the top of the corresponding figures and a downward direction (or lower) being toward the bottom of the corresponding figure.

Each support arm 35, 36, 37 may initially extend perpendicularly from the spine 30 over the base 40, and continue downwardly as it extends further away from the spine 30 before extending in an orientation generally co-planar with the base 40. A distal end of each support arm 35, 36, 37 provides a support basket or hand 150, 160, 170, wherein each support hand 150, 160, 170 may provide a planar palm portion and a plurality of spaced apart upwardly extending finger portions. The support arm and or support hand may have a recessed groove for structural support.

Each support hand 150, 160, 170 is dimensioned and adapted to support a plurality of nested containers 50, 60, 70, 80, 90 and associated lids 100, 110, 120, 130, 140, respectively. In such a supported condition the containers 50, 60, 70, 80, 90 may rest on the palm portion of each support hand 150, 160, 170.

Each lid and container pairing can form a removable side connection by way of a container tab 56 and lid attachment points 66 for removable connecting each container to the paired lid in a connected condition, as illustrated in FIGS. 7, 8, 9 and 10, and FIGS. 11 and 12. The lid attachment points 66 may be a spaced-apart array of a pair of attachment points, so that a user may selectively interlock or connect the lid to the container tab 56 at different relative elevations or points along the spaced apart pair of lid attachment points 66.

Each container and lid may be color coded by size and/or material to facilitate immediate size/material recognition of containers and their respective matching lids.

A method of using the present invention may include the following. The container and lid storage device 10 disclosed above may be provided. A user may move the container and lid storage device 10 to the extended condition for removably placing the containers 50, 60, 70, 80, 90 on their respective palm portions and removably attaching the associated lids 100, 110, 120, 130, 140, see FIG. 6. Thereby, each container and associated lid may be stored adjacent each other by size (and possibly color) for immediate size recognition.

Figure 3:
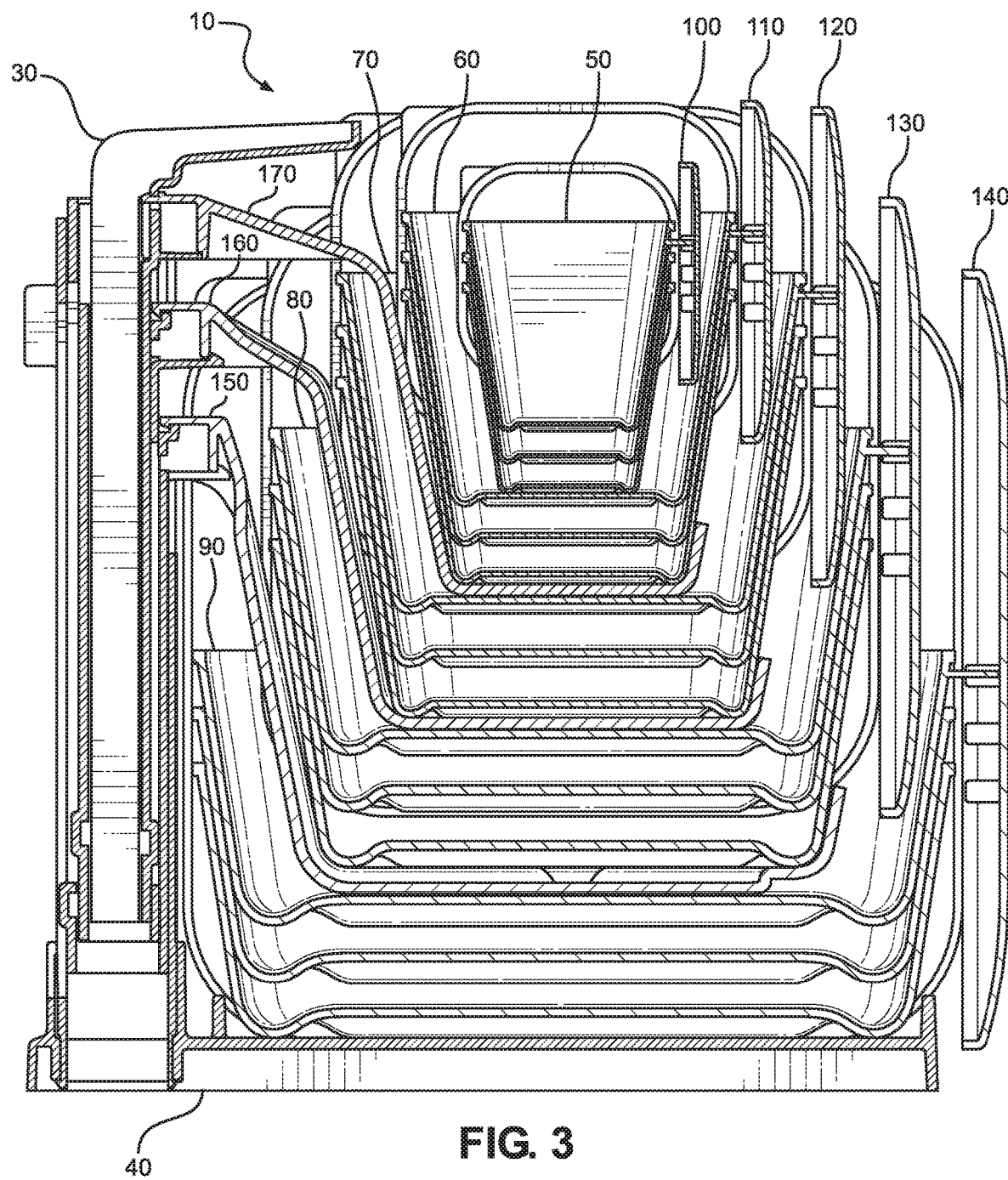
FIG. 3 is a section view of an exemplary embodiment of the present invention, taken along line 3-3 of FIG. 1.
Figure 4:
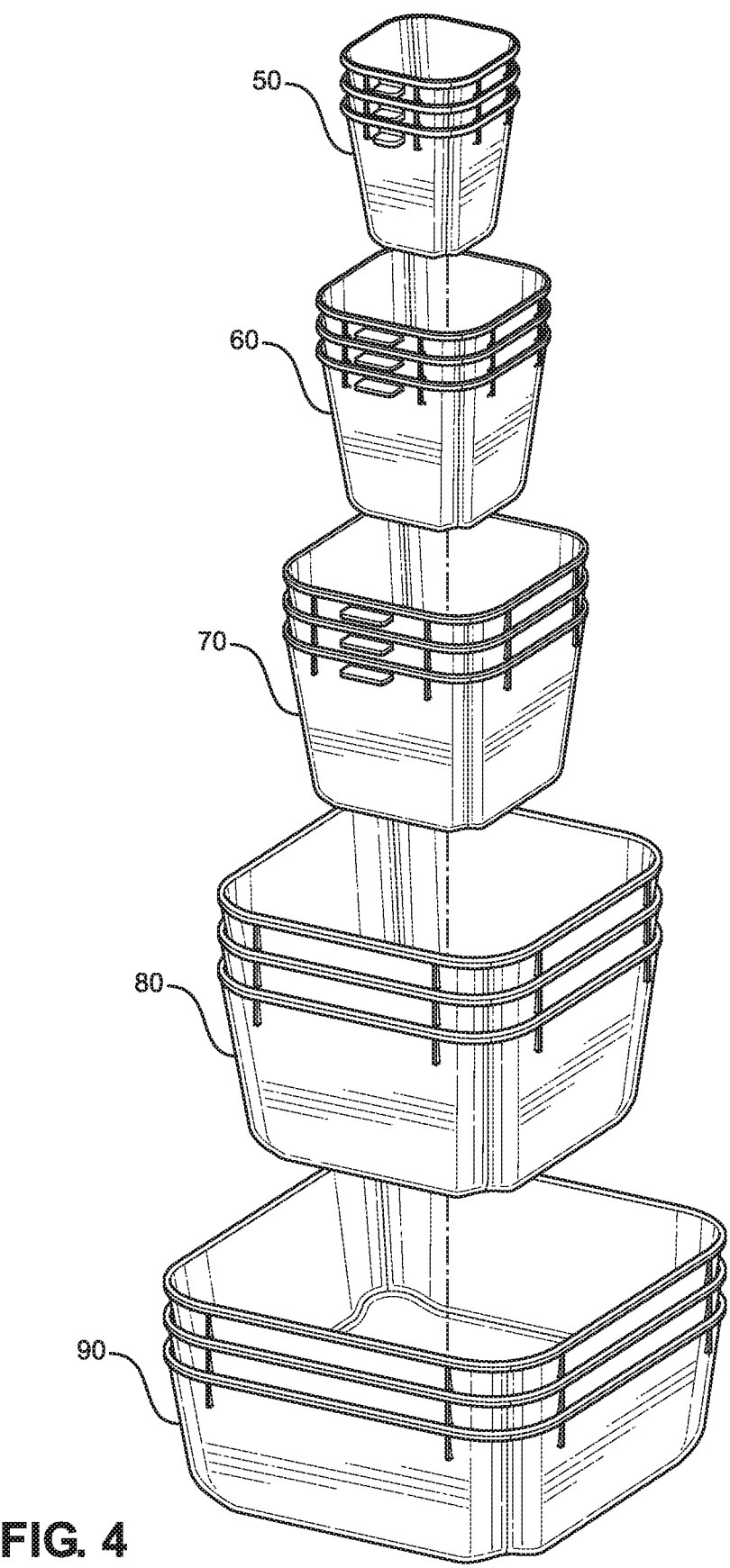
FIG. 4 is an exploded view of an exemplary embodiment of a plurality of differently sized and nested containers of the present invention.
Figure 5:
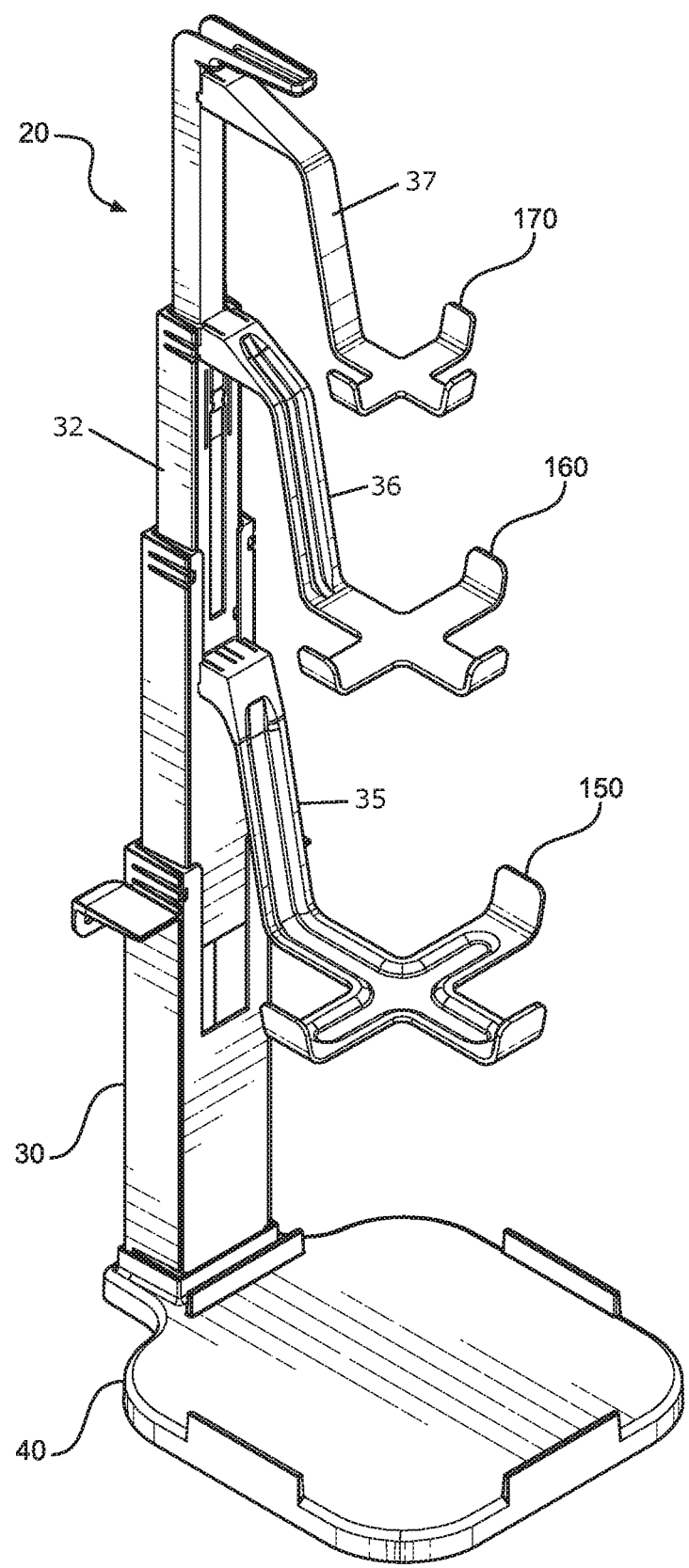
FIG. 5 is a perspective view of an exemplary embodiment of the present invention, demonstrating the base and spine assembly in an extended condition.
Figure 6:
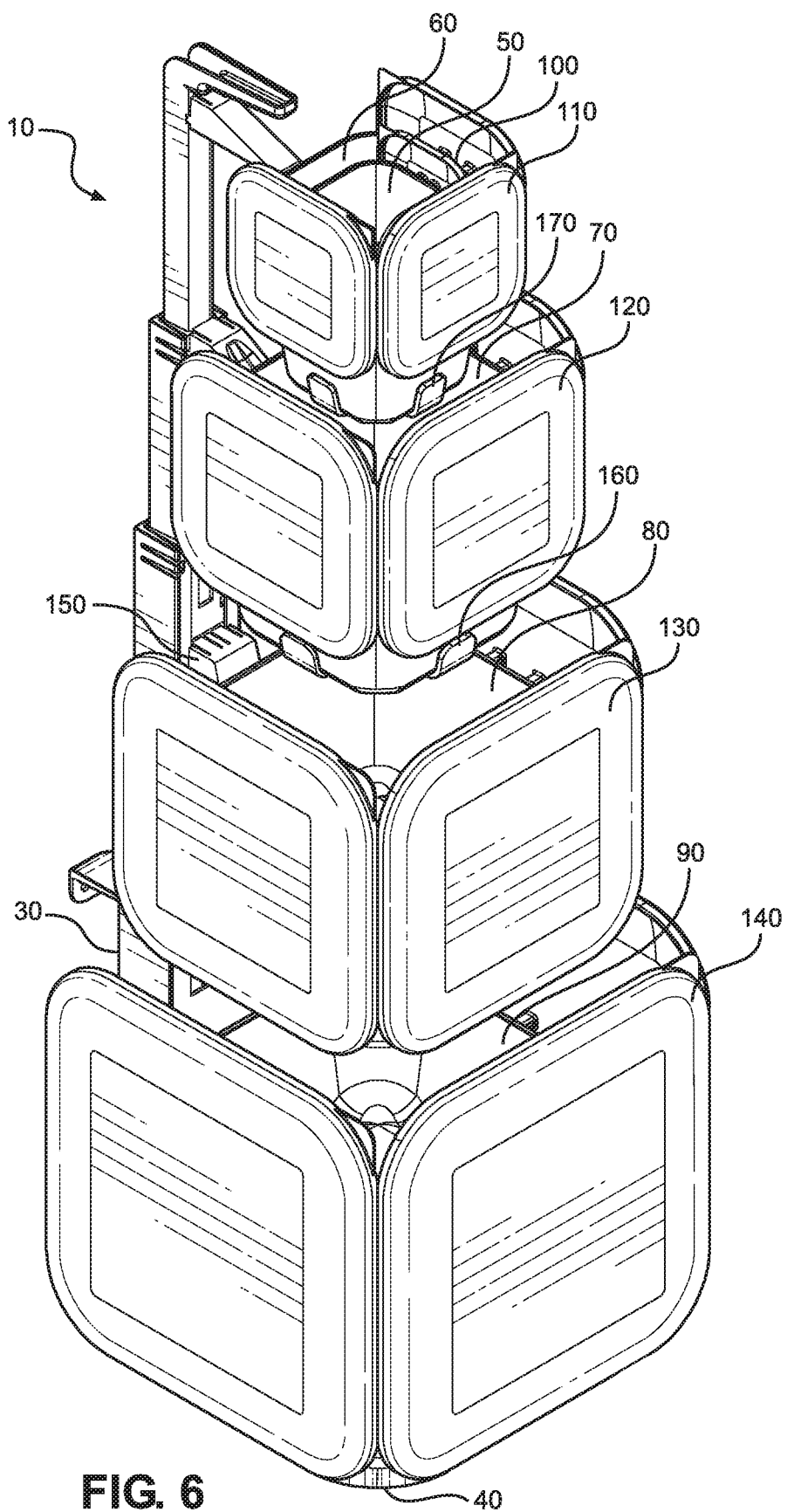
FIG. 6 is a perspective view of an exemplary embodiment of the present invention, demonstrating FIG. 5 in use removably retaining a plurality of containers and lids.
Figure 7:
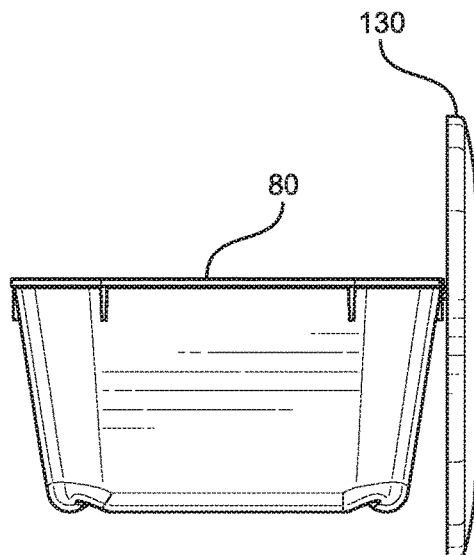
FIG. 7 is an elevation view of an exemplary embodiment of a container an associated lid of the present invention.
Figure 8:
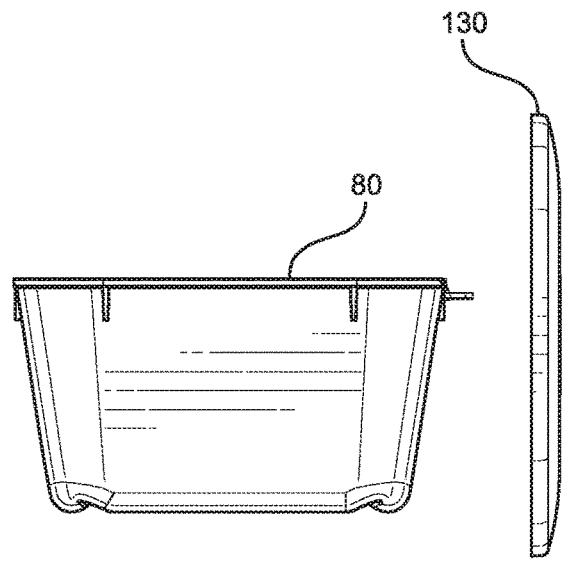
FIG. 8 is an elevation view of an exemplary embodiment of a container an associated lid of the present invention.
Figure 9:
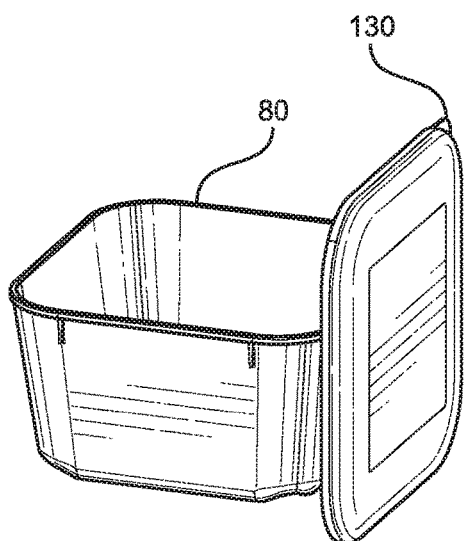
FIG. 9 is a perspective view of an exemplary embodiment of a container an associated lid of the present invention.
Figure 10:
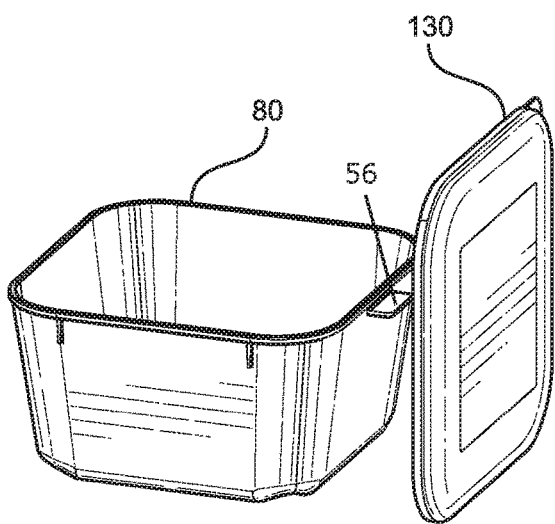
FIG. 10 is a perspective view of an exemplary embodiment of a container an associated lid of the present invention.
Figure 11:
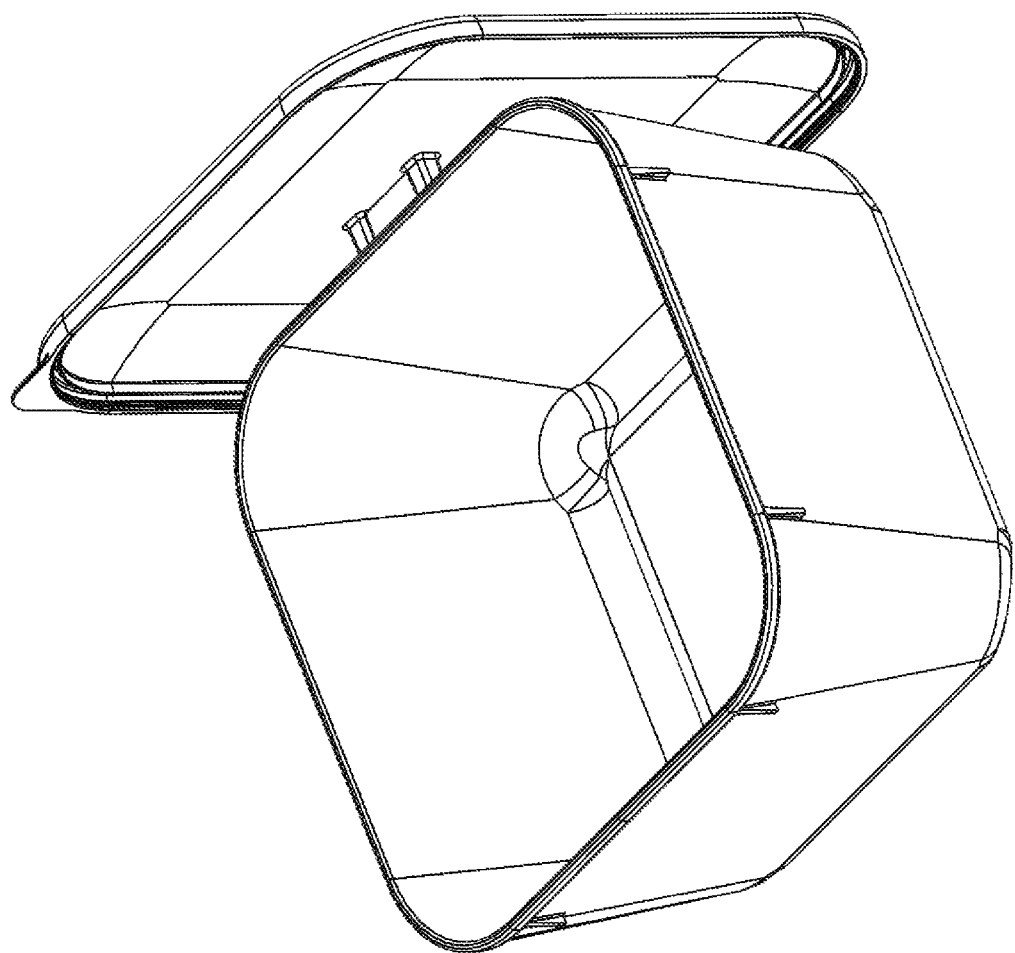
FIG. 11 is a perspective view of an exemplary embodiment of a container an associated lid of the present invention.
Figure 12:
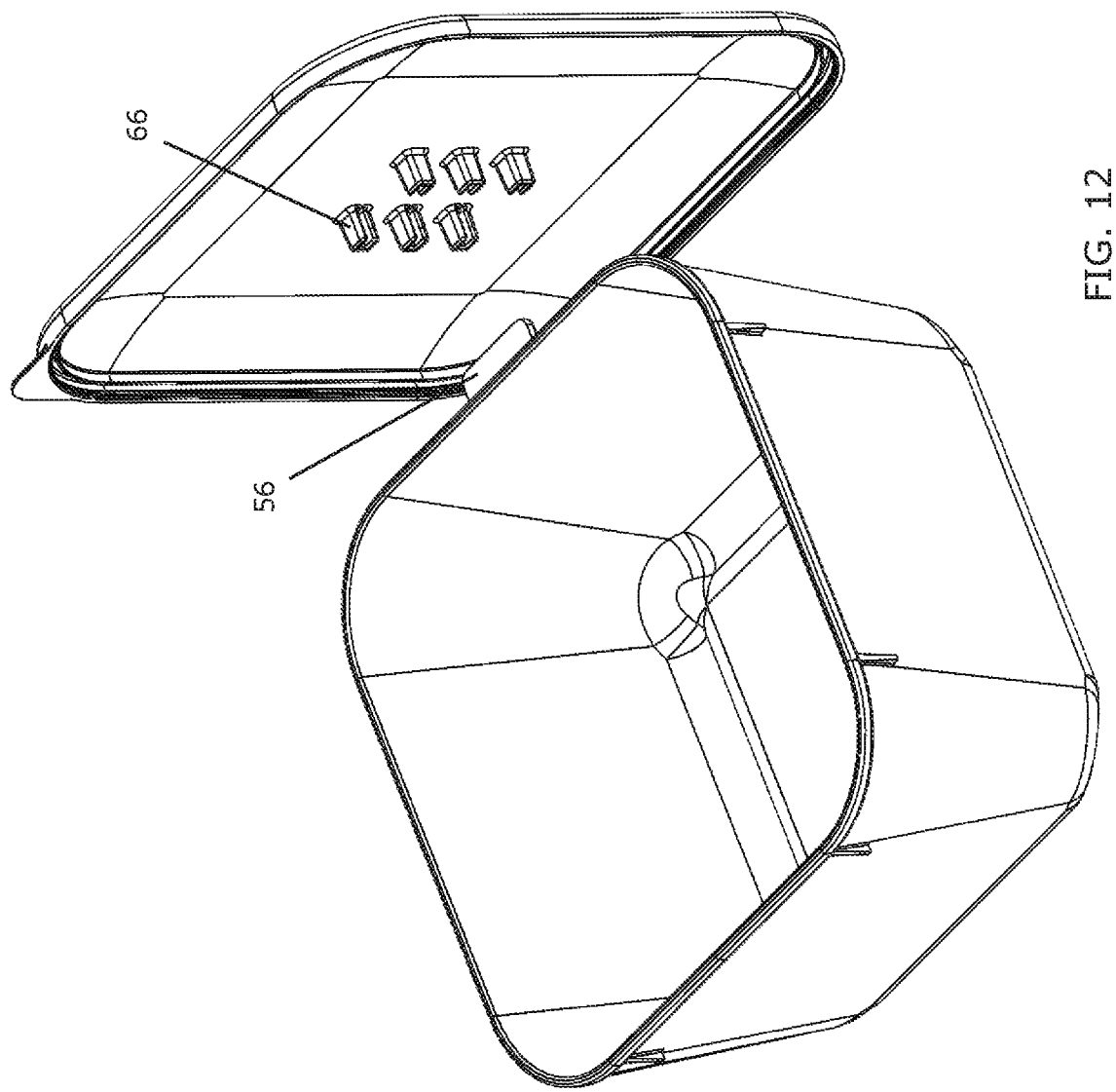
FIG. 12 is a perspective view of an exemplary embodiment of a container an associated lid of the present invention.

Then the user may move the container and lid storage device 10 to the collapsed condition, as illustrated in FIGS. 1 and 3. In the collapsed condition, the hand portions are dimensioned and adapted to be received into the nested containers associated with the lower-adjacent support arm—i.e., the next-larger sized container—making for compact storage. By way of example, the hand portion 170 of support arm 37 is dimensioned and adapted to be received in the containers associated with and sized for adjacent support arm 36/support hand 160. As a result, in the collapsed condition, support arm 37 and associated containers nest into the containers associated with support arm 36, as illustrated in FIG. 3.

The container and lid storage device 10 can be mounted to the wall or cabinet, or any other vertical flat surface.

It should be understood, of course, that the foregoing relates to exemplary embodiments of the invention and that modifications may be made without departing from the spirit and scope of the invention as set forth in the following claims.

What is claimed is:

1. A container and lid system, comprising:
a container having an opening defined by a periphery;
a tab protruding outwardly from the periphery;
a lid having an inner surface dimensioned to be at least coextensive with the opening when the lid is in a horizontal orientation; and
a plurality of attachment points provided along the inner surface, wherein each attachment point removably engages the tab when the lid is in a vertical orientation, wherein the plurality of attachment points is spaced apart in an array, and wherein the array is at least three attachment points are aligned in one vertical column.

2. The container and lid system of claim 1, wherein the array is at least nine attachment points are aligned in three vertical columns.

3. The container and lid system of claim 1, wherein each attachment point is a pair of flanges that are spaced apart to frictionally engage opposing sides of the tab.

4. A lid system for a plurality of containers in a nested condition, comprising:
each container has an opening defined by a periphery;
a tab protruding outwardly from the periphery;
each periphery protrudes a stacked distance from the periphery of an adjacent container of the plurality of containers in the nested condition;
a plurality of lids, each lid having an inner surface dimensioned to be at least coextensive with the opening when the lid is in a horizontal orientation; and
a plurality of attachment points vertically spaced apart by the stacked distance along said inner surface in a vertical alignment, wherein each attachment point removably engages said tab when the lid is in a vertical orientation,
whereby up to three containers of the plurality of containers in the nested condition engage a first, a second, and a third lid, respectively, of the plurality of lids wherein each lid terminates at a shared elevation.

5. The lid system for a plurality of containers in a nested condition of claim 4, wherein the plurality of attachment points defines an array of at least three rows and at least three columns.

6. The lid system for a plurality of containers in a nested condition of claim 4, wherein each attachment point is a pair of flanges that are spaced apart to frictionally engage opposing sides of the tab.

* * * * *